United States Patent [19]

Waters et al.

[11] 4,440,916
[45] Apr. 3, 1984

[54] PROCESS FOR SOLID STATE FREE RADICAL REACTIONS

[75] Inventors: Paul F. Waters; Thomas T. Scambos, both of Washington, D.C.

[73] Assignee: General Technology Applications, Inc., Reston, Va.

[21] Appl. No.: 375,653

[22] Filed: May 6, 1982

Related U.S. Application Data

[63] Continuation of Ser. No. 198,385, Oct. 20, 1980, abandoned.

[51] Int. Cl.³ .................. C08G 81/00; C08G 83/00; C08J 3/20
[52] U.S. Cl. ........................... 525/54.2; 523/307; 525/54.23; 525/165; 525/167; 525/168; 525/169; 525/170; 525/171; 525/177; 525/178; 525/184; 525/197; 525/198; 525/426; 525/445; 525/479; 525/904; 528/481
[58] Field of Search .............. 523/307; 525/904, 197, 525/198, 54.2, 54.23, 105, 106, 165, 167–171, 177, 178, 184, 426, 445, 479; 528/481

[56] References Cited

U.S. PATENT DOCUMENTS

| | | | |
|---|---|---|---|
| 2,966,474 | 12/1960 | Jurgeleit | 524/583 |
| 3,992,350 | 11/1976 | Bensa et al. | 523/309 |
| 4,169,826 | 10/1979 | Gilbert et al. | 524/448 |
| 4,273,294 | 6/1981 | Hollely et al. | 241/18 |
| 4,340,076 | 7/1982 | Weitzen | 241/23 |

FOREIGN PATENT DOCUMENTS

| | | |
|---|---|---|
| 15151 | 9/1980 | European Pat. Off. . |
| 945337 | 5/1949 | France . |
| 2182684 | 12/1973 | France . |
| 2242210 | 3/1975 | France . |
| 1404677 | 9/1975 | United Kingdom . |

OTHER PUBLICATIONS

Chem. Abs. 96313, vol. 68, (1968), Dubinskaya et al.
Chem. Abs. 96318, vol. 68, (1968), Dubinskaya et al.
Chem. Abs. 79695, vol. 83, (1975), Dubinskaya et al.
Chem. Abs. 64056, vol. 81, (1974), Butyagin et al.
Chem. Abs. 115024, vol. 77, (1972), Dubinskaya et al.
Chem. Abs. 48005, vol. 70, (#12), Dubinskaya et al.
Chem. Abs. 50250, vol. 68, (#12), Radtsis et al.
Chem. Abs. 82485, vol. 67, (1967), Dubinskaya et al.
Derwent Abst. 58267B/32, 8–1979.
Derwent Abst. 10726V/06, 1–1974.
Derwent Abst. 05959E/04, 10–1981.

*Primary Examiner*—Herbert J. Lilling
*Attorney, Agent, or Firm*—Roland H. Shubert

[57] ABSTRACT

Particles of two different normally solid materials are caused to react by generating free radicals on the surfaces of at least one of the solids by mechanical working, suitably by comminution, at cryogenic temperatures. At least one of the solids is preferably a polymeric material while the other may be a different polymer, a catalyst, a lubricity enhancing material, a filler, a pigment or the like.

9 Claims, No Drawings

PROCESS FOR SOLID STATE FREE RADICAL REACTIONS

BACKGROUND OF THE INVENTION

This application is a continuation of Application Ser. No. 198,385 filed on Oct. 20, 1980 and now abandoned.

This invention relates generally to a process for conducting solid state, free radical reactions.

More specifically, this invention relates to a process for generating and maintaining a concentration of free radicals on and in particles of a normally solid material by mechanical working of the material of cryogenic temperatures and thereafter carrying out a solid-solid reaction with another material.

It has been recognized, particularly in the Russian literature, that free radicals may be generated on macromolecules at cryogenic temperatures by pulverizing polymer solutions in a vibrational mill. Subsequent reactions of the so-generated free radicals with certain low molecular weight substances were confirmed and studied by means of EPR techniques. An exemplary article setting out such investigations was authored by A. M. Dubinskaya and P. Yu. Butyagin, entitled, "Mechanical-Chemical Investigations of Some Free-Radical Reactions in the Solid Phase" and published in English translation in *Kinetics & Catalysis*, Vol. 9, pp. 839-846, July, 1968.

Typical of the approaches taken by these investigators was to dissolve a polymer in an appropriate solvent, place the solution in a sealed ampoule together with glass or steel spheres, freeze the solution by contacting the ampoule with liquid nitrogen and thereafter pulverize the frozen solution by vibrating the ampoule. Solid state, free radical reactions with solvent molecules and with reactive gases, principally oxygen, were confirmed and their reaction rates estimated. Experimentally derived reaction rate constants were found to be on the order of $10^6$ greater than was expected from extrapolation of literature data to low temperatures.

Those experimental techniques serve to confirm the development of free radicals on polymer molecules by mechanical activation at cryogenic temperatures and to confirm their reactivity toward certain low molecular weight compounds. However, the reaction technique disclosed by Dubinskaya, et al., is severely limited in that it is restricted to reactions between the free radical-containing polymers and certain reactive gases such as oxygen, and with certain low molecular weight liquids which also act as solvents for the polymeric material. Additionally, the technique disclosed by Dubinskaya, et al., is essentially impossible to scale-up to any practical production level.

There is disclosed and claimed in copending, commonly assigned patent application Ser. No. 117,235, a method for very rapidly dissolving polymeric materials in compatible liquids. The polymeric material is comminuted at cryogenic temperatures, as by hammer milling, and is thereafter mixed with a liquid preferably while still at cryogenic temperature. Dissolution of the polymer particles in appropriate liquids is extremely rapid; many orders of magnitude faster than is possible using conventional techniques. It is postulated in that patent application that the phenomenally increased dissolution rate obtained may be, at least in part, due to the presence of free radicals on and in the polymer particles created by the mechanical comminution. Dissolution activity of the polymer particles can be maintained for extended periods of time by storage at cryogenic temperatures, e.g., as a slurry in liquid nitrogen.

SUMMARY OF THE INVENTION

There is provided a process for carrying out solid-solid free radical reactions. Free radicals are generated on and in solid particles by cryogenically comminuting at least one solid material and maintaining the so-comminuted particles in a protected environment until reaction with another solid, preferably in finely divided form, is complete. It is preferred that at least one of the solids comprises an organic macromolecule, typically a polymer. The reaction may be conducted by mixing the reactants in liquid cryogenic refrigerant or in a suspension of gaseous refrigerant at cryogenic temperatures and allowing them to warm up while in intimate contact.

Hence, it is an object of this invention to provide a method for conducting solid-solid free radical reactions.

It is another object of this invention to generate free radicals on at least the surface of a particulate solid and to thereafter react that solid with a second particulate solid.

Another object of this invention is to cause reaction of a polymeric material with a second solid substance which may be another polymeric material.

Other specific objects of this invention will be apparent from the following description of the process and various embodiments thereof.

DISCUSSION OF THE INVENTION

In its broadest sense, this invention comprises the generation of free radicals on and in particulate solids and thereafter reacting the so-generated free radicals with another solid. Free radical generation is accomplished by mechanical working of the solid at cryogenic temperatures preferably accompanied by substantial size reduction or communition. The mixing of the free-radical containing solid with the coreactant must be carried out at cryogenic temperatures before allowing intermediate warm-up so as to reduce fruitless free radical reactions.

The reaction between a free radical-carrying solid particle and another solid reactant may be accomplished by mixing the reactant materials as a slurry or dispersion in a liquid cryogenic refrigerant or as a gaseous suspension in refrigerant vapors as in a fluidized or semi-fluidized bed. Typical reactions which may be carried out in this manner include a variety of addition and substitution reactions as for example hydrogen atom transfer.

At least one of the reactants must be amenable to free radical generation by mechanical working thereof. This group includes generally those organic molecules having a molecular weight in excess of about 1000; especially polymeric materials. Polymeric materials amenable to use in this invention include both natural and synthetic polymers having a molecular weight ranging from a few thousand to 10,000,000 or more. The polymers may be crystalline or amorphous, atactic or isotactic, homopolymers or heteropolymers. Exemplary polymer systems useful in this invention include hydrocarbon polymers in general such as the polyolefins, acrylic, acetal and other film forming polymers such as the vinyl resins, esters of cellulose, chlorinated polymers such as the polyvinyl and polyvinylidene chlorides, polyethers, nitriles, polyamides, polyimides, polyesters, silicones, sulfones, polysulfides and many others.

Free radicals are generated on and in the polymer particles by mechanical working thereof at cryogenic temperatures. Maintenance of cryogenic temperatures during free radical generation is mandatory and critical in order to prevent immediate radical decay and/or migration. The obtaining and maintenance of cryogenic temperatures is preferably accomplished through use of a vaporizing cryogenic refrigerant. By cryogenic temperatures, there is meant temperatures ranging from about the equilibrium temperature of a dry ice-acetone bath to the boiling point of liquid helium, or from about $-78°$ C. to about $-267°$ C. It is also necessary that the cryogenic refrigerant used be essentially non-reactive toward the free radicals generated. A most preferred cryogenic refrigerant for use in this invention is liquid nitrogen which combines a boiling point of about $-196°$ C., essential inertness toward free radicals and relative economy and availability.

Mechanical working of the polymer to generate free radicals is preferably combined with a substantial degree of size reduction or comminution. Because solid-solid free redical reactions must necessarily take place at the particle surfaces, the larger the specific surface, the more complete a reaction may be obtained. Consequently, in most applications of this process, it is advantageous to obtain as high a degree of comminution as is possible. Some reduction of average molecular weight is observed as a result of intense mechanical comminution. Each rupture of the main polymer chain, of course, causes a reduction in the average molecular weight as well as a generation of free radicals at the rupture point. However, the total free radical concentration is many times greater than the number of main chain ruptures with each molecule displaying some ten to one hundred points of injury or free radical sites.

Comminution of polymeric materials may be accomplished through use of a variety of impact mills maintained at cryogenic temperatures, as by cooling with liquid nitrogen, during operation. It is to be noted that even those polymers of a gummy or sticky consistency at ambient temperatures are amenable to comminution in this fashion as the cryogenic temperatures contemplated for use in this process are typically far below the embrittlement temperature of such polymers.

Hammer mills of the type having internal gas classification are particularly suited for use in obtaining a high degree of comminution of polymeric materials. Mills of this sort are well known to the art and a number of different types are commercially available. All are characterized in having particle classification systems in which coarse, or oversize, particles are continually returned to the grinding elements while fine particles are carried from the mill in an exiting gas stream. Most are amenable to adjustment whereby the desired product particle size may be obtained. Mills of this sort can typically produce a product having a size range of 99% smaller than 5 to 10 microns.

An even finer degree of comminution may be obtained through use of a fluid energy or jet mill. In one type of jet mill, a fluid as for example nitrogen gas at cryogenic temperature, is admitted in fine, high-energy streams at an angle about the periphery of a grinding and classifying chamber. Particles are intercepted by the angle jets as they travel around the periphery of the grinding-classifying chamber causing a high degree of turbulence which causes the particles of grind upon themselves. Another type of jet mill uses fluid streams to convey particles at high velocity into a chamber where two streams impact upon each other. Most mills utilize the energy of the flowing gas stream to obtain a centrifugal classification with return of the oversize particles to the grinding operation. In some instances, it is advantageous to conduct a two-stage comminution; the first stage using a hammer mill and the second stage using a jet mill.

As has been set out before, after free radicals have been generated on and in one particulate solid, it is reacted with a second particulate solid. In one application both solids may be polymeric materials. Polymers of two different types may be cryogenically comminuted and thereafter reacted to produce a hybrid polymer which may be considered somewhat analogous to a block copolymer. The product polymer typically displays properties of a network, or cross-linked, polymer in those instances wherein the reactant polymers were linear.

In those cases where both solids are polymers, the reaction may be conducted by cryogenically comminuting each polymer in a hammer or jet mill, collecting the comminuted particles in a cryogenic liquid refrigerant, suitably liquid nitrogen, and causing contact between the polymer particles as by mild agitation or stirring. The reactant mixture is then allowed to gradually warm while protecting it from exposure to reactive gases, principally oxygen and water vapor, until the temperature is above the cryogenic region. While reaction rates are extremely rapid as compared to other solid-solid reactions, some $10^6$ or more times faster than is predicted from extrapolation of rate constants obtained at ambient temperatures, reaction times ranging from a few minutes to a few hours must be provided.

The two polymers may be comminuted separately or in admixture. Rather than contacting the polymer particles as a slurry in the liquid cryogenic refrigerant, the polymer particles may be mixed in gaseous suspension as in a fluidized or spouted bed using cold cryogenic vapors as the fluidizing or spouting gas. More than two different polymers may be co-reacted.

In other applications of this process a polymeric material having free radicals generated thereon may be reacted with a non-polymeric particulate solid. The non-polymeric material must contain a reactive moiety, as for example a replaceable hydrogen atom, for the reaction to proceed. There results a reaction product in which polymeric molecules are chemically bonded to surface sites on the non-polymeric particle. When these co-reacted particles are later dispersed in a liquid which is a solvent toward the polymeric material, the attached polymer chains or molecules tend to prevent agglomeration or clumping of the particulates. Additionally, the polymer chains impart a degree of apparent solubility to the particulate solids. This effect, of producing apparent solubility to an otherwise insoluble material, increases as the average particle size of the solid material decreases. Thus, there may be obtained stable, essentially non-settling, dispersions of finely divided solids in a liquid medium.

Attachment of polymer molecules to a particulate solid, which may be a catalytic material, a lubricity enhancing solid, a pigmenting material, a filler or the like, acts to substantially modify the apparent physical properties of the individual particles. As a result, finely divided catalytic solids may be used in a later catalytic reaction as essentially a solvent-soluble catalyst; lubricity enhancing solids such as graphite may be incorporated into a lube oil as a stable and essentially non-settling suspension; various fillers and pigments may be much more easily and uniformly dispersed into a plastic or rubber formulation and inks and paints having non-settling characteristics may be produced.

The type of polymeric material reacted with a particulate solid may be selected to give the desired properties to the reaction product. For example, reaction of a cryogenically comminuted, linear polyolefin with a very finely divided powder of titanium trichloride will allow dispersion of the reaction product in a hydrocarbon solvent, n-heptane or the like, in essentially a non-settling condition. The titanium trichloride may then be reacted with an aluminum alkyl to form a Ziegler-Natta type catalyst and treated for subsequent reaction purposes as if it were a soluble catalyst.

Lubricant grade graphite particles may be reacted with cryogenically comminuted polymers and thereafter compounded with a conventional lube oil stock to form a non-settling oil suitable for use in internal combustion engines and the like. In this application, it is preferred that the polymer be a linear hydrocarbon polymer of relatively low, from about 50,000 to about 1,000,000, molecular weight. Stable, graphite containing greases may be formulated in a similar fashion.

Other non-polymeric materials including carbon black and inorganic pigments and inorganic fillers such as titania, alumina and silica, may be reacted with a variety of cryogenically ground polymeric materials to enhance their dispersibility in the formulation of rubber and plastic compounding materials and for the production of stable, non-settling inks and paints. Selection of the particular polymer or polymers for use in such applications is governed in large part by the characteristics of the medium into which the reaction product is later dispersed. For example, when dispersing the reaction product in a solvent system as in an ink or paint, the polymer chosen must display a significant degree of solubility in that solvent.

In some cases, the particulate, non-polymeric solid may be subjected to a chemical pre-treatment to enhance its reactivity toward the free radicals produced on the cryogenically comminuted particle surfaces. This chemical pre-treatment may, for example, comprise reaction with hydrogen gas at elevated temperatures resulting in the formation of replaceable hydrogen sites for reaction with free radicals.

It is generally advantageous to utilize particles of both polymer and other material of as small a size as is possible because the degree of chemical reaction obtainable is a function of available surface area. In most cases, it is preferred that the maximum particle size be on the order of 10 microns or less and in a most preferred embodiment, particle size should not exceed 2 to 3 microns.

While a number of specific embodiments of this invention have been set out in the specification, other uses will be apparent to those skilled in the art.

We claim:

1. A process for the solid state reaction of a first normally solid polymer with at least one other normally solid polymer which comprises:
   generating free radicals on at least the surface of said first polymer by the mechanical working of said polymer at cryogenic temperature in an atmosphere non-reactive toward said free radicals;
   maintaining at least said first polymer at cryogenic temperatures, and
   while at cryogenic temperatures, contacting said first polymer with said other polymer and subsequently heating at a rate and for a time sufficient to cause reaction between said first and second polymers.

2. The process of claim 1 wherein said mechanical working comprises comminution at cryogenic temperatures.

3. The process of claim 2 wherein said first and other polymers are contacted in the presence of liquid or a gaseous cryogenic refrigerant.

4. The process of claim 3 wherein said cryogenic refrigerant is nitrogen.

5. The process of claim 2 wherein both said polymers are comminuted at cryogenic temperatures.

6. The process of claim 5 wherein cryogenic temperatures are maintained during comminution and contacting by use of liquid nitrogen as a cryogenic refrigerant.

7. The process of claim 6 wherein particles of both said polymers are contacted by agitation in a slurry of liquid nitrogen.

8. The process of claim 2 wherein said polymer is comminuted to produce particles having a maximum size of about 10 microns.

9. The process of claim 8 wherein particles of said other polymer have a maximum size of about 10 microns.

* * * * *